United States Patent
Goosey et al.

Patent Number: 5,966,247
Date of Patent: Oct. 12, 1999

[54] COMPACT ZOOM LENS

[75] Inventors: William T. Goosey, Fairport, N.Y.;
Kazunaga Shimizu, Nagano, Japan

[73] Assignee: Eastman Kodak Company, Rochester, N.Y.

[21] Appl. No.: 08/994,313

[22] Filed: Dec. 19, 1997

[51] Int. Cl.$^6$ .................................................. G20B 15/22
[52] U.S. Cl. ...................... 359/689; 359/676; 359/684; 359/685
[58] Field of Search ................................ 359/676, 684, 359/685, 689, 708

[56] References Cited

U.S. PATENT DOCUMENTS

| | | | |
|---|---|---|---|
| 5,042,926 | 8/1991 | Kikuchi | 359/684 |
| 5,153,776 | 10/1992 | Nozawa | 359/376 |
| 5,270,866 | 12/1993 | Oizumi et al. | 359/684 |
| 5,289,317 | 2/1994 | Ikemori et al. | 359/689 |
| 5,539,582 | 7/1996 | Kohno et al. | 359/689 |

*Primary Examiner*—Georgia Epps
*Assistant Examiner*—David N. Spector
*Attorney, Agent, or Firm*—Svetlana Z. Short

[57] ABSTRACT

A zoom lens comprises a plurality of lens elements arranged into three zooming lens units. These zooming lens units are spaced from one another by axial distances that vary during zooming. The lens units are a negative power front lens unit, a positive power middle lens unit and a negative power rear lens unit. At least one of the lens units continually moves away from the image plane, as the zoom lens zooms from a wide angle position toward a telephoto position so that the distance from this lens unit to the image plane varies in sigmoidal relation with respect to the focal length of the zoom lens.

19 Claims, 16 Drawing Sheets

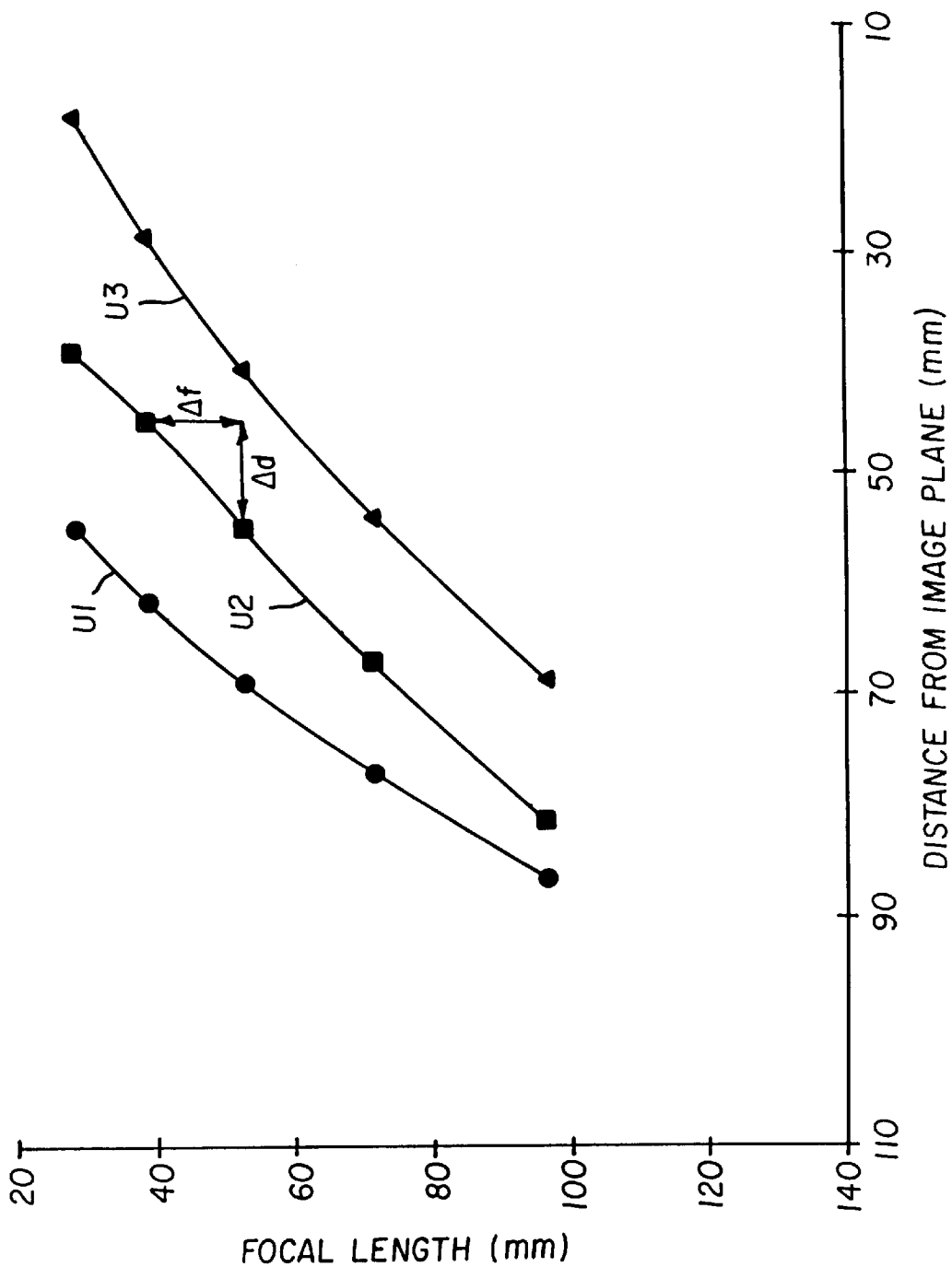
FIG. IC

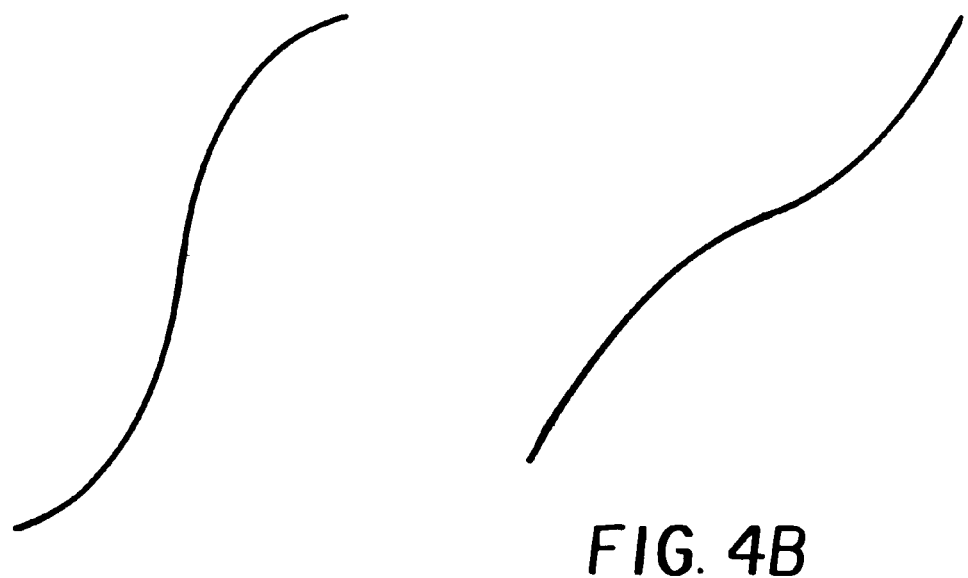
FIG. 4A
FIG. 4B
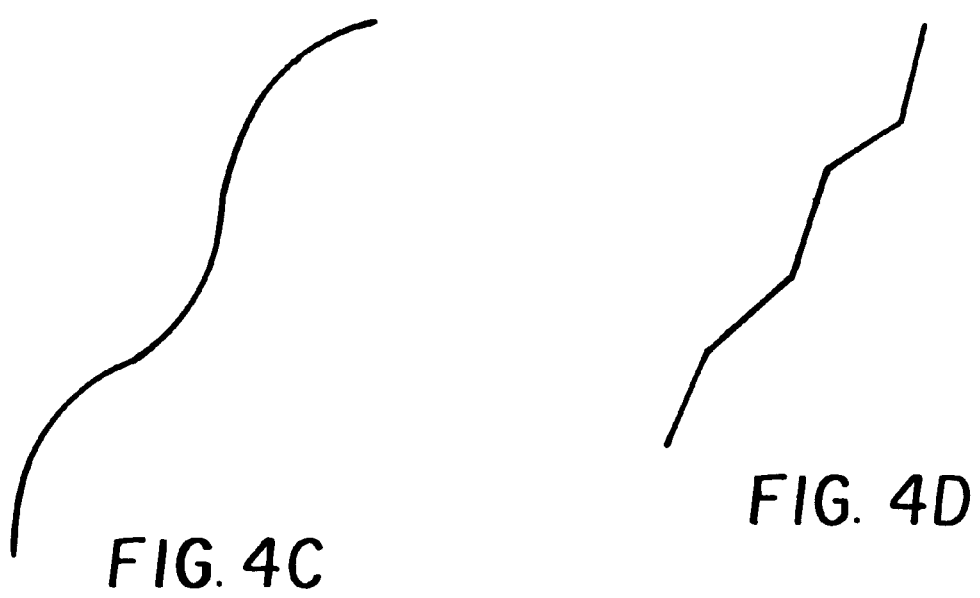
FIG. 4C
FIG. 4D

COMPACT ZOOM LENS

CROSS REFERENCE TO RELATED APPLICATION

This application is related to commonly assigned, copending U.S. application, Ser. No. 08/925,692, entitled ZOOM LENS, in the name of Lee Estelle, filed on Sep. 9, 1997.

FIELD OF THE INVENTION

This invention relates to compact zoom lenses. Although this invention has a general application, it is particularly suitable to zoom lenses with zoom ratios of 3.5× or greater.

BACKGROUND OF THE INVENTION

Compact zoom lenses having a small number of lens elements and providing large zoom ratios are highly desirable.

Zoom lenses with a negative power front lens unit, a positive power middle lens unit and a negative power rear lens unit (i.e., "−+−" configuration) that provide 2× to 3× zoom ratios are known. Some of the zoom lenses of the "−+−" configuration are relatively compact and have relatively few lens elements (seven). U.S. Pat. No. 5,539,582 discloses such zoom lenses. However, these zoom lenses do not provide large enough zoom ratios and their structures can not be easily modified to provide larger zoom ratios.

Zoom lenses of the "−+−" configuration providing larger zoom ratios are also known. For example, U.S. Pat. No. 5,153,776 discloses zoom lenses with eleven lens elements providing zoom ratios of 3.6×. U.S. Pat. No. 5,289,317 discloses zoom lenses with ten and eleven lens elements. Some of these zoom lenses provide zoom ratios of 3.6× and 4.6×. All of these zoom lenses are large, complex, have many lens elements and, therefore, are expensive to produce.

SUMMARY OF THE INVENTION

It is an object of the present invention to produce a compact zoom lens providing a large zoom ratio (3.5× or greater) with a minimum number of lens elements.

Briefly described, a zoom lens according to the present invention has a focal length that changes during zooming, provides an image at an image plane and comprises a plurality of lens elements arranged into three zooming lens units. These zooming lens units are spaced from one another by axial distances that vary during zooming. The lens units are a negative power front lens unit, a positive power middle lens unit and a negative power rear lens unit. At least one of the lens units continually moves away from the image plane, as the zoom lens zooms from a wide angle position toward a telephoto position so that the distance from this lens unit to the image plane varies in sigmoidal relation with respect to the focal length of the zoom lens.

According to one embodiment, at least one lens unit moves away from the image plane (1) at a first rate as the zoom lens moves from the wide angle position to a first intermediate position, (2) at a second, slower rate as the zoom lens moves from the first intermediate position to a second intermediate position, and (3) at a third rate which is faster than the second rate, when the zoom lens moves from the second intermediate position towards the telephoto position. According to one embodiment, this lens unit is the negative power front lens unit.

According to one embodiment of the present invention the zoom lens satisfies the following inequalities:

$$\frac{Ft}{Fw} > 3.5;$$

$$FVFPt \leq Ft;$$

$$FVFPo < FVFPt,$$

where

Ft is the focal length of said zoom lens in the telephoto position,

Fw is the focal length of said zoom lens in the wide angle position,

FVFPt is a front vertex to image plane distance when said zoom lens is in the telephoto position, and FVFPo is a front vertex to image plane distance when the zoom lens is in any zoom position other than the telephoto position.

According to one embodiment, the zoom lens also satisfies one or more of the following inequalities:

$0.6 < FVFPt/Ft < 0.9$ $1.7 < B_{3T}/B_{3W} < 4.0$, $0.10 < |f_2/Ft| < 0.20$, $0.5 < |f_3/Fw| < 1.0$, $1.2 < (e_{1W} - e_{1T})/(e_{2W} - e_{2T}) < 3.0$ and $e_{1W} < e_{1M}$, where $B_{3T}$ is the magnification of the negative power rear lens unit in the telephoto position, and $B_{3W}$ is magnification of this lens unit in the wide angle position;

$f_2$ is the focal length of the positive power middle lens unit and $f_3$ is the focal length of the negative power rear lens unit;

$e_{1W}$, $e_{1T}$ is the distance between the negative power front lens unit and the positive power middle lens unit, when the zoom lens is in the wide angle position and the telephoto position, respectively;

$e_{2W}$, $e_{2T}$ is the distance between the positive power middle lens unit and the negative power rear lens unit in the wide angle position and the telephoto position, respectively; and $e_{1M}$ is the distance between the negative power front lens unit and the positive power middle lens at some intermediate zoom position.

It is an advantage of the zoom lenses of the present invention that they provide a large zoom ratio and an excellent image quality while being compact and having a small number of lens elements.

BRIEF DESCRIPTION OF THE DRAWINGS

The foregoing and other objects, features and advantages of the invention as well as presently preferred embodiments thereof, will become more apparent from reading the following description in connection with the accompanying drawings.

FIG. 1C illustrates the motions of three lens units of a second zoom lens embodiment as the zoom lens of FIG. 1A zoom from a wide angle position to the telephoto position. More specifically, FIG. 1C is a plot of the distance from each of the lens units to an image plane vs. zoom lens focal length.

FIGS. 4A–4D illustrate exemplary sigmoidal curves.

DETAILED DESCRIPTION OF THE PREFERRED EMBODIMENT

Zoom Lens Configuration

Figure 1A:
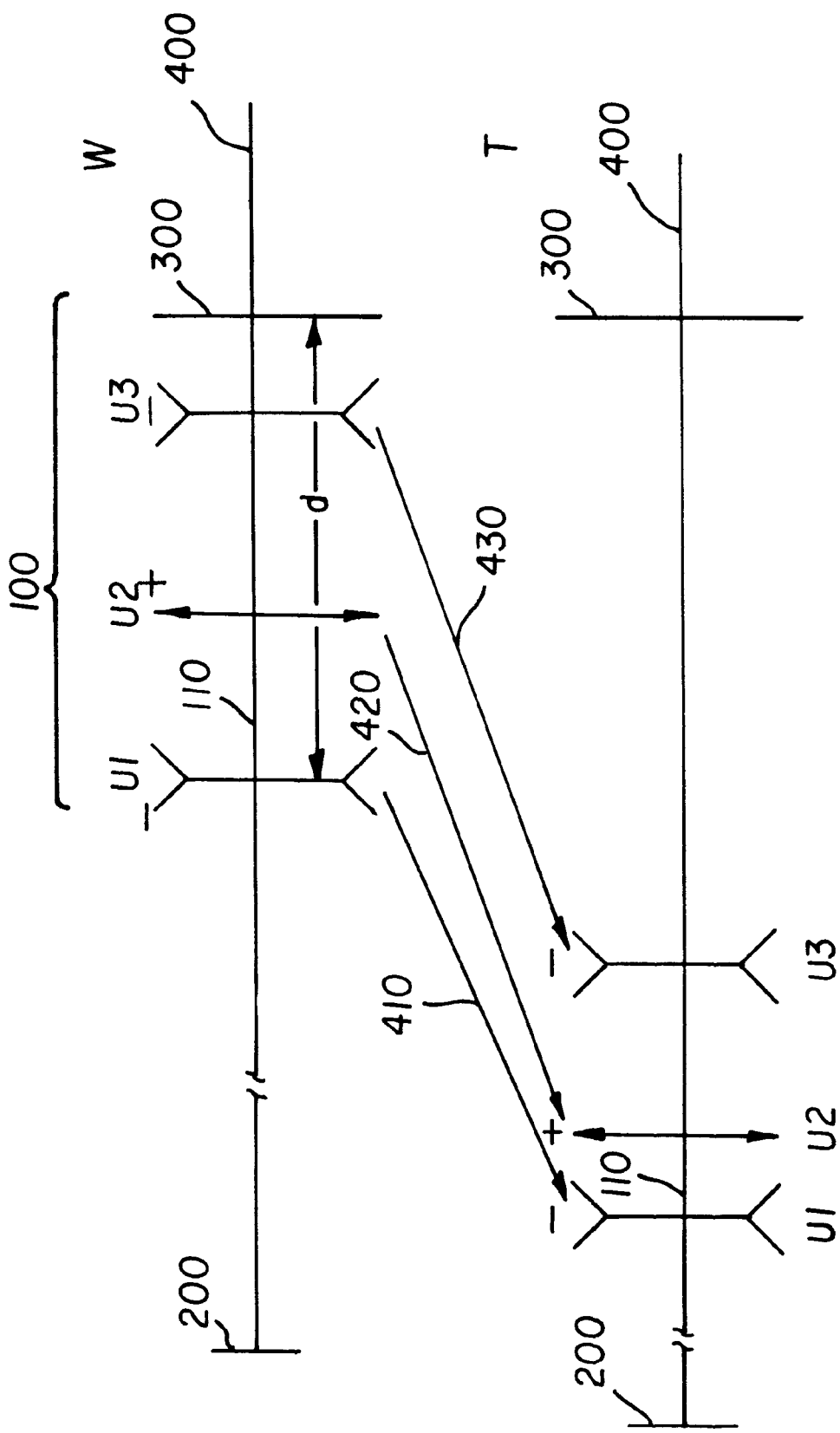
FIG. 1A is a schematic depiction of a lens unit arrangement of a first zoom lens embodiment.

With reference to FIGS. 1A, 2A–2E and 3A–3E, zoom lenses 100, 100' image an object 200 onto an image plane 300 and comprise three axially movable zooming lens units U1, U2, and U3 arranged along an optical axis 400. The front (i.e., the most object side) lens unit U1 has negative optical power. The middle lens unit U2 has positive optical power. It is located between the front lens unit U1 and the rear lens unit U3. The rear lens unit U3 has negative optical power.

Zoom lenses 100, 100' have a focal length f that varies from Ft to Fw. Ft is the focal length of a zoom lens in the telephoto position and Fw is the focal length of a zoom lens in the wide angle position. Zoom lens 100 has a zoom ratio of about 5× (i.e., Ft/Fw=5) and accepts a (wide) angle field of view of about 68 degrees. Zoom lens 100' has a zoom ratio of about 3.5× and accepts a (wide angle) field of view of about 60 degrees. The second zoom lens embodiment 100' is very similar to the first zoom lens embodiment 100. In the telephoto position, the zoom lens 100' is more compact than the zoom lens 100. However, this compactness is achieved because the telephoto focal length Ft of the zoom lens 100' is smaller than the telephoto focal length Ft of the zoom lens 100.

Figure 2A:
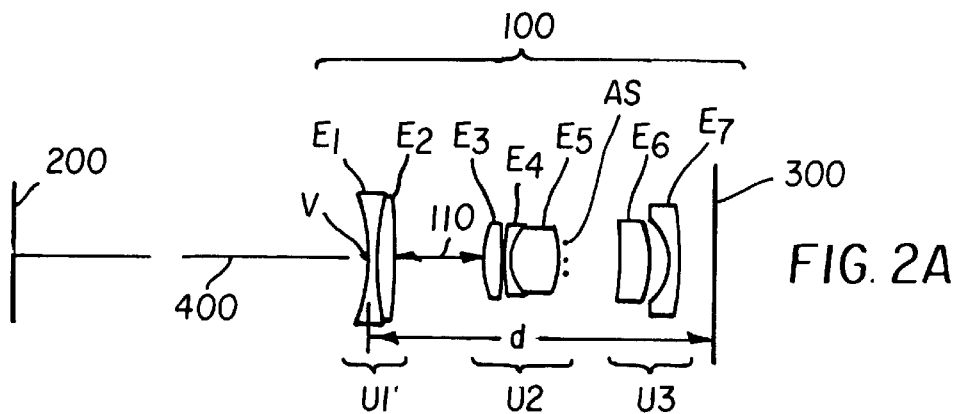
FIGS. 2A–2E are side views of the first zoom lens embodiment.
Figure 2B:
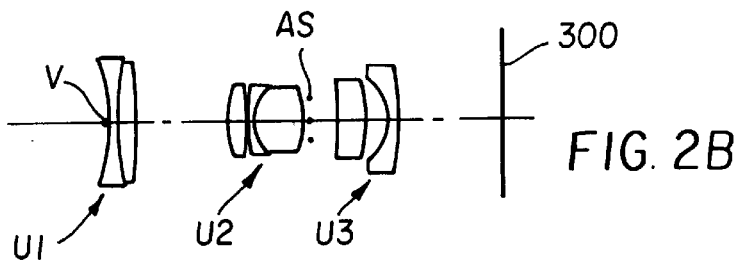
Figure 2C:
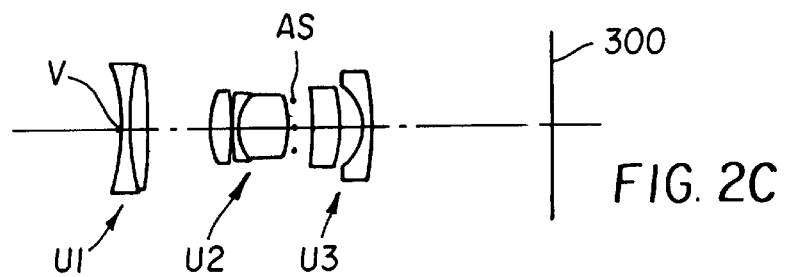
Figure 2D:
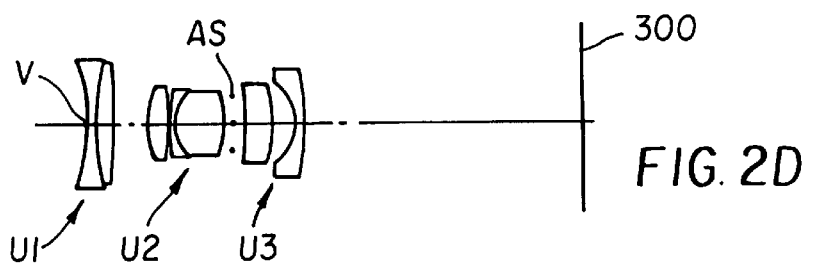
Figure 2E:
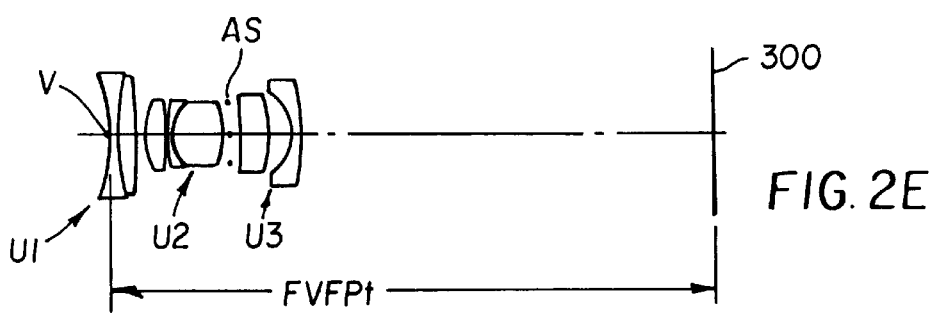
Figure 3A:
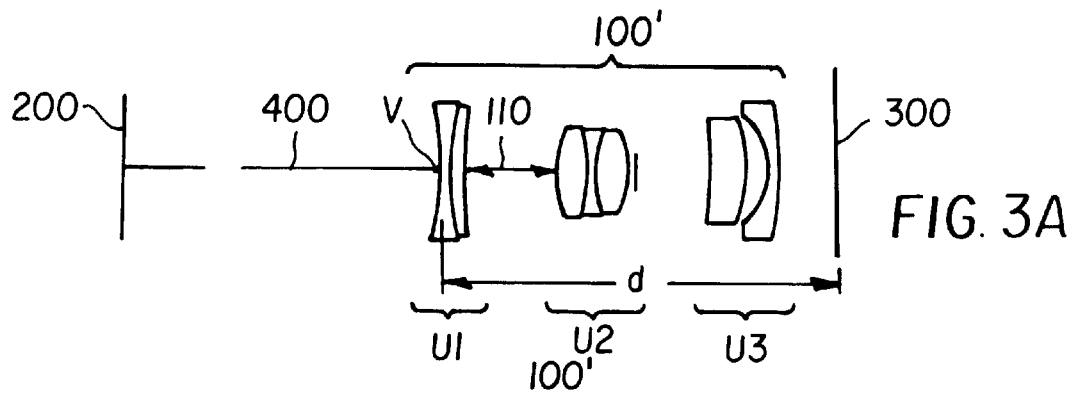
FIGS. 3A–3E are side views of the second zoom lens embodiment.
Figure 3B:
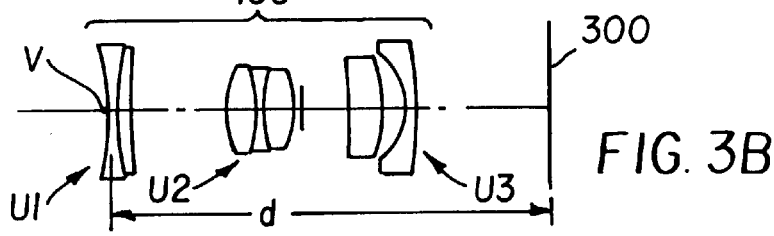
Figure 3C:
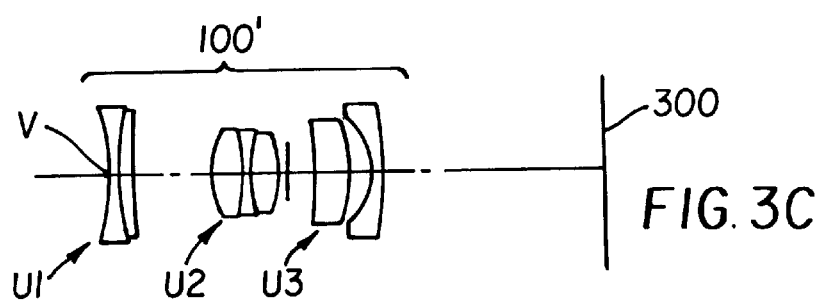
Figure 3D:
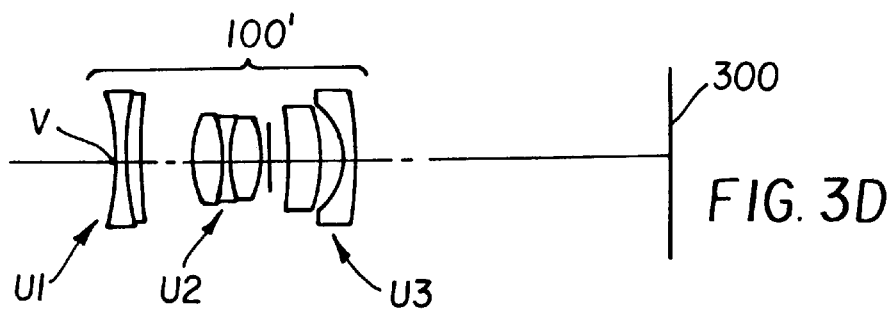

More specifically, FIGS. 2A–2E and 3A–3E correspond to the first and the second zoom lens embodiments 100, 100', respectively. FIGS. 2A and 3A show locations of the zooming lens units U1, U2, and U3 when zoom lenses 100 and 100' are in their respective wide angle positions (f=Fw). FIGS. 2D and 3D show locations of the lens units U1, U2, U3 when zoom lenses 100, 100' are in their respective telephoto positions (f=Ft). FIGS. 2B, 3B and 2C, 3C show the location of the lens units U1, U2, U3 when zoom lenses 100, 100' are in intermediate zoom positions.

As zooming lens units U1, U2, U3 move from the wide angle position towards the telephoto position, the airspace distance 110 between the front lens unit U1 and the middle lens unit U2 first increases until it reaches its maximum value and then continually decreases to until the zoom lens 100, 100' is in the telephoto position. This change of the airspace 110 between the front lens unit U1 and the middle lens unit U2 enhances the large zoom ratio and helps to maintain an image at a fixed location. The motion of the three lens units U1, U2, U3 of the first zoom lens embodiment 100 are schematically illustrated by arrows 410, 420, 430 in FIG. 1A. Relative locations of the three zooming lens units U1, U2 and U3 of the first zoom lens embodiment 100 and distances from each one of the three lens units (measured from the front most lens surface of each lens unit) to the image plane 300 are plotted in FIG. 1B. Relative locations of the three zooming lens units U1, U2 and U3 of the second zoom lens embodiment 100' and distances from each lens unit (measured from the front most lens surface of each lens unit) to the image plane are plotted in FIG. 1C.

The negative power front lens unit U1 of the zoom lens 100, 100' is spaced from the image plane 300 by a predetermined distance d. This predetermined distance d continually increases as the zoom lens zooms from the wide angle position to the telephoto position. The plot of the distance d relative to the focal length of the zoom lens 100 is a sigmoidal curve (see FIG. 1B). A sigmoidal curve is a curve that has points on opposing sides of a straight line drawn trough three (3) points located on this curve. FIGS. 4A–4D illustrate several types of sigmoidal curves. It will be understood that the term curve may include a relationship shown in FIG. 4D where this relationship is formed by straight line segments. These curves are shown as examples of a lens unit's motion and are not limiting. Other sigmoidal curves are also possible. The commonly assigned, co-pending application also describes zoom lenses with motions that are characterized by plots of lens unit displacements vs. focal lengths which are sigmoidal. More specifically, the front lens unit U1 of the zoom lens 100 moves away from the image plane (1) at a first rate $R_1$ as the zoom lens moves from the wide angle position to a first intermediate position, (2) at a second, slower rate $R_2$ as the zoom lens moves from the first intermediate position to a second intermediate position, and (3) at a third rate $R_3$ which is faster than the second rate, when said zoom lens moves from the second intermediate position towards the telephoto position. That is $R_2<R_1$ and $R_2<R_3$. The term "rate" as used herein is defined as a distance $\Delta d$ traveled by a lens unit from the image plane (as the lens unit moves from one position to another position), divided by the focal length change $\Delta f$ between these two positions, i. e., the rate $R=\Delta d/\Delta f$. The axial displacement (from the image plane) of the front lens unit U1 of the second zoom lens embodiment 100' relative to the focal length of the zoom lens follows a "c" shaped curve (FIG. 1C). This lens unit U1 of the second zoom lens embodiment also continuously moves (axially) away from the image plane as the zoom lens 100' zooms from the wide angle position toward the telephoto position.

The front lens unit U1 (see FIGS. 2A, 3A ) includes a negative power biconcave lens element $E_1$ and a positive power biconvex lens element $E_2$. Having the positive power lens element in conjunction with the negative power lens element improves the color correction of zoom lenses 100, 100'. In zoom lens 100, the two lens elements $E_1$ and $E_2$ are uncemented (FIG. 2A). In zoom lens 100', the two lens elements $E_1$ and $E_2$ are cemented into a single lens component (FIG. 3A).

It is preferred that the middle lens unit U2 include at least one positive power lens element and at least one negative power lens element to facilitate color correction. Alternatively, a diffractive surface may be used in lieu of the negative power lens element. The middle lens unit U2 of the zoom lens 100, 100' comprises a positive power biconvex lens element $E_3$, a negative power lens element $E_4$ and a positive power lens element $E_5$. It is preferred that the middle lens unit U2 have at least one aspheric surface to better control aberrations, such as the third and higher order spherical aberrations. More specifically, the positive power biconvex lens element $E_3$ of the lens unit U2 (of the zoom lens 100, 100') is biaspheric. That is, it has two aspheric surfaces.

Figure 1B:
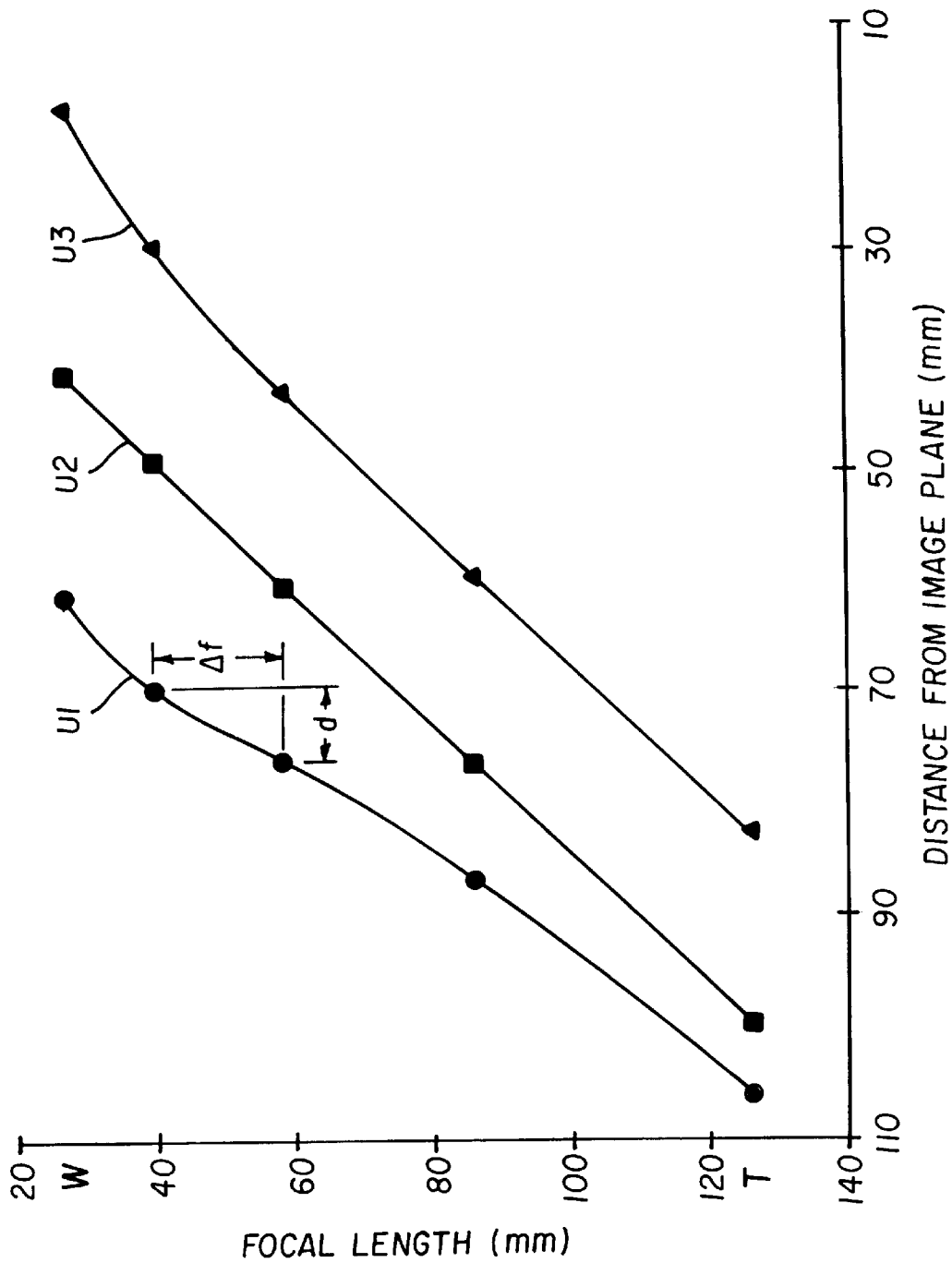
FIG. 1B illustrates the motions of the three lens units of the first zoom lens embodiment.

FIG. 1C shows that the middle lens unit U2 of the second zoom lens embodiment 100' continually moves along the optical axis, away from the image plane in sigmoidal relation to the focal length of the zoom lens, as the zoom lens 100' zooms from the wide angle position toward the telephoto position. In the first zoom lens embodiment 100 this relation is approximately linear (FIG. 1B).

The rear lens unit U3 comprises two lens elements $E_6$ and $E_7$. It is preferable that at least one lens element of the rear lens unit U3 has at least one aspheric surface to facilitate (field) aberration correction such as correction of distortion, astigmatism and field curvature. It is more preferable that the rear lens unit U3 have two aspheric surfaces. The lens element $E_6$ of the rear lens unit U3 faces the middle lens unit U2 and has a positive optical power. This lens element $E_6$ (in both zoom lenses 100 and 100') has two aspheric surfaces— i.e., it is biaspheric. The lens element $E_7$ is the rearmost lens element. It is a meniscus lens element and has a negative optical power. Its concave surface faces the lens element $E_6$.

Figure 3E:
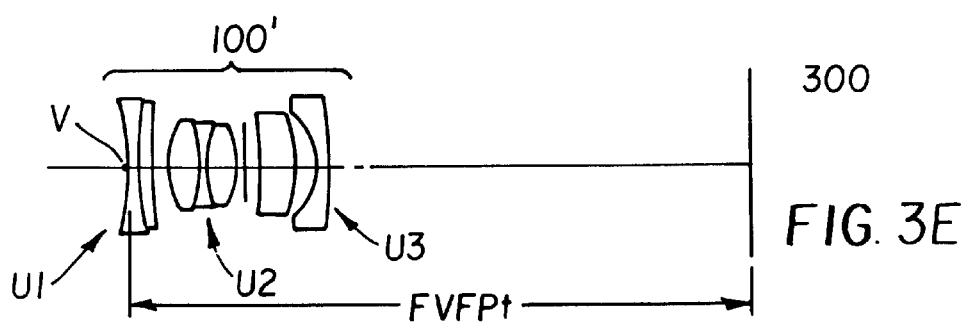

It is preferred that zoom lens 100, 100' has a focal length Ft in the telephoto position that is greater or is approximately equal to the distance FVFPt (see FIGS. 2E and 3E). That is:

$$Ft \geq FVFPt \tag{1}$$

It is even more preferred that the telephoto ratio FVFPt/Ft at the telephoto position be:

$$0.6 < FVFPt/Ft < 0.9 \tag{2}$$

The distance (FVFPt) is defined as a distance measured along the optical axis 400, from the front most vertex V of the zoom lens 100, 100' to the image plane 300, when the zoom lens is in the telephoto position. More specifically, in the zoom lens 100 Ft is 126.11 mm and FVFPt is 105.97 mm. Zoom lens 100' has a telephoto focal length Ft of 96.5 mm and its distance FVFPt is 86.6 mm. Furthermore, in all other zoom positions, the front most vertex to the image plane distance FVFPo is smaller than the distance FVFPt. Thus, it is preferred that the zoom lens satisfy the following equation:

$$FVFPo < FVFP_t \tag{3}$$

These conditions help the zoom lens to maintain its compactness in the telephoto position.

In addition, in order for a zoom lens to have a large zoom ratio, i.e., a zoom ratio Ft/Fw of 3.5, and preferably 4 or larger, it is preferred that the zoom lens satisfy the following inequality:

$$1.7 < B_{3T}/B_{3W} < 4.0, \tag{4}$$

where $B_{3T}$ is the magnification of the rear lens unit U3 in the telephoto position and $B_W$ is the magnification of the rear lens unit in the wide angle position. It is preferred, in order for the zoom lens to achieve a zoom ratio of 4× or higher, that the ratio $B_{3T}/B_3w$ be between 3.5 and 4. Zoom lens 100 has a zoom ratio of 5× and the ratio $B_{3T}/B_{3W}$ of 3.56. Zoom lens 100' has a zoom ratio of 3.5× and the ratio $B_{3T}/B_{3W}$ of 2.66.

Further, in order to achieve the large zoom ratio and the extended telephoto focal length Ft, it is preferred that a zoom lens satisfy the following inequality:

$$0.10 < |f_2/Ft| < 0.20 \tag{5}$$

where $f_2$ is the focal length of the positive power middle lens unit U2.

The ratio of the middle lens unit focal length $f_2$ to the Ft must be small in order to achieve a compact zoom lens. Values greater than 0.2 limit the maximum focal length Ft and hence do not allow for large zoom ratios. If the lower limit is exceeded strong astigmatism results, and it can not be corrected without an aspherical surface.

It is also preferred that the zoom lens satisfy the following condition in the wide angle position:

$$0.5 < |f_3/Fw| < 1.0, \tag{6}$$

where $f_3$ is the focal length of the rear lens unit U3. If the upper limit is exceeded the zoom lens becomes less compact. If the lower limit is exceeded, the off-axis aberrations become difficult to correct.

In addition, it is preferred that the zoom lens satisfy the two following inequalities. These inequalities also helps to maintain zoom lens compactness.

$$1.2 < (e_{1W} - e_{1T})/(e_{2W} - e_{2T}) < 3.0 \tag{7}$$

$$e_{1W} < e_{1M}, \tag{8}$$

where $e_{1W}$, $e_{1T}$ is the distance between the negative power front lens unit U1 and the positive power middle lens unit U2, when the zoom lens is in the wide angle position and the telephoto position, respectively; $e_{2W}$, $e_{2T}$ is the distance between the positive power middle lens unit U2 and the negative power rear lens unit U3 in the wide angle position and the telephoto position, respectively; and $e_{1M}$ is the distance between the negative power front lens unit U1 and the positive power middle lens U2 at some intermediate zoom position.

Figure 5A:
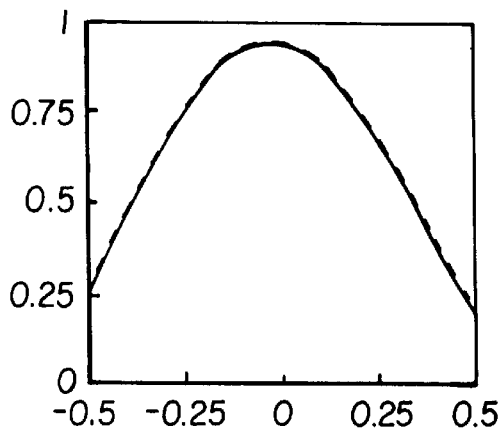
FIGS. 5A–5Y are plots of the through focus Modulation Transfer Function (MTF) of the zoom lens illustrated in FIGS. 2A–2E.
Figure 5B:
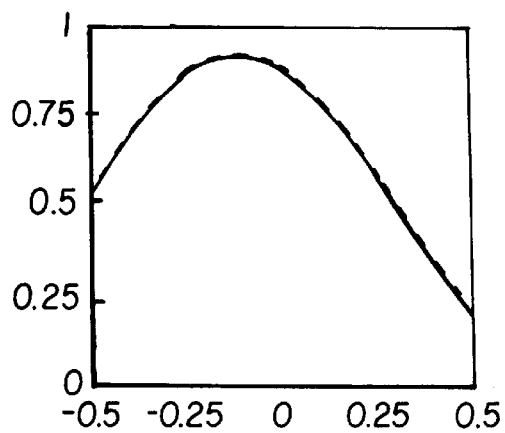
Figure 5C:
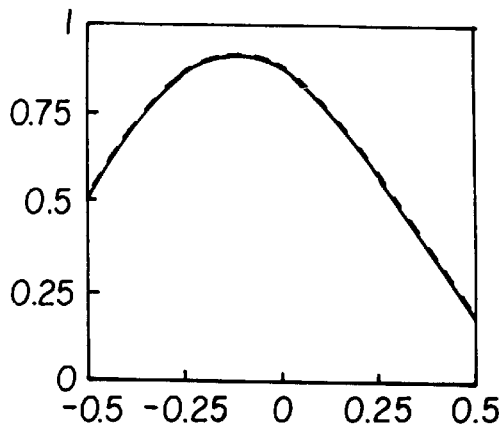
Figure 5D:
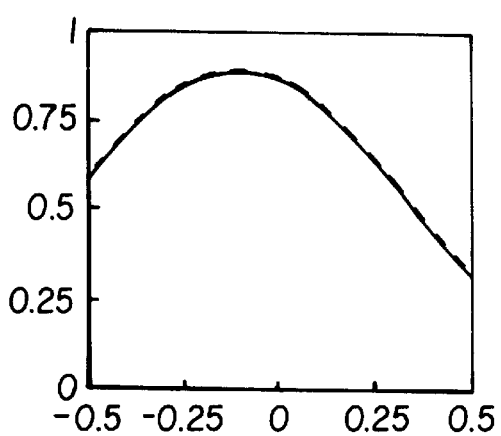
Figure 5E:
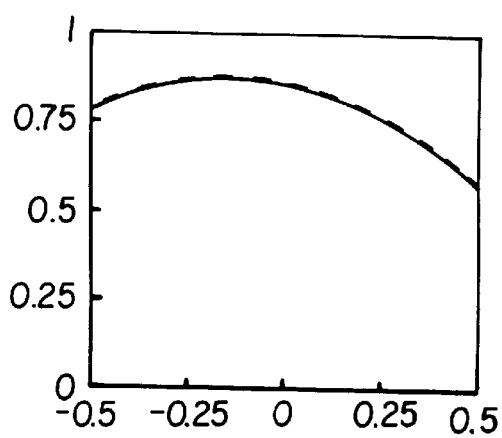
Figure 5F:
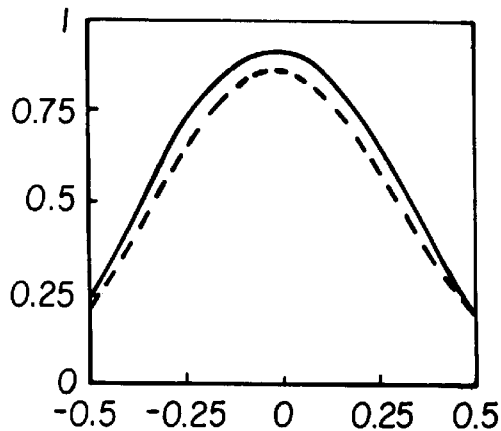
Figure 5G:
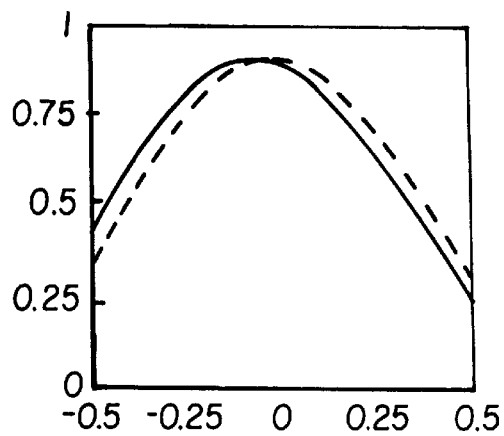
Figure 5H:
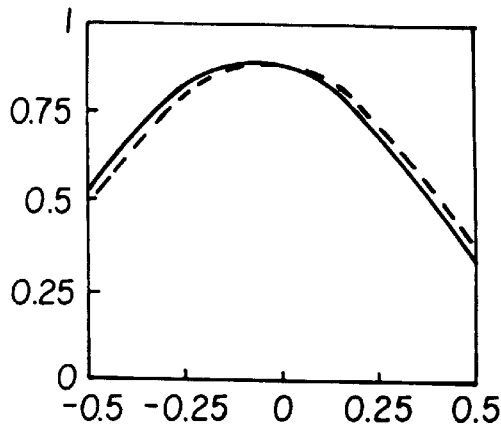
Figure 5I:
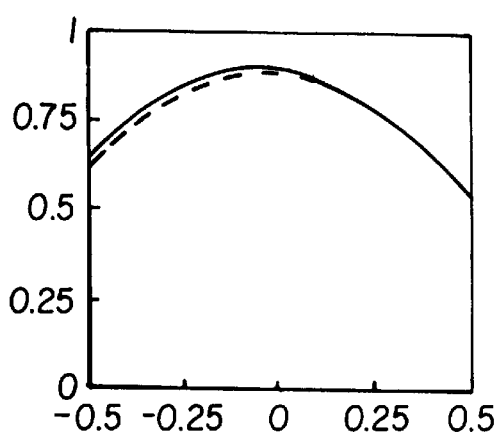
Figure 5J:
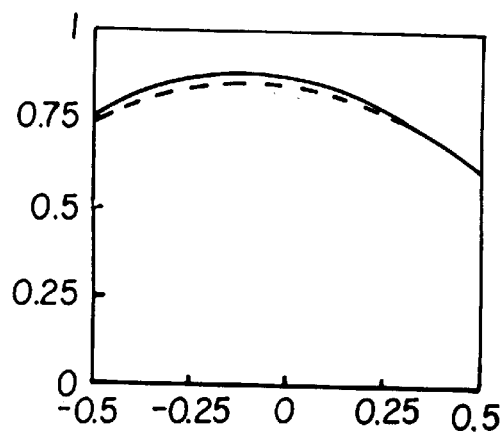
Figure 5K:
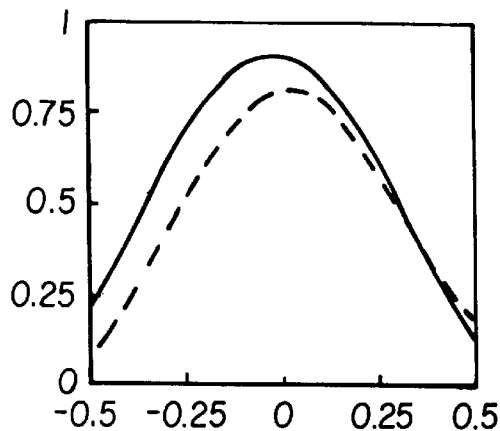
Figure 5L:
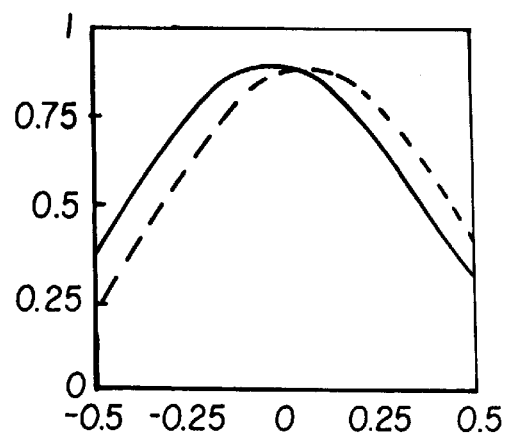
Figure 5M:
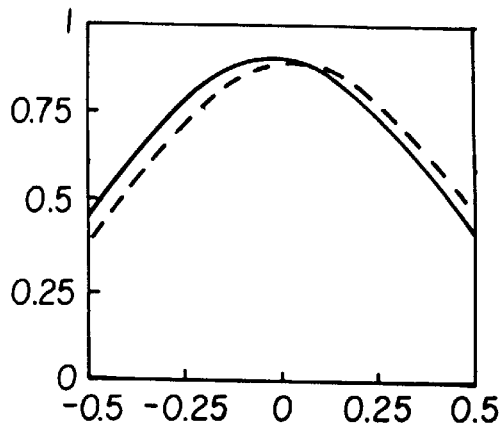
Figure 5N:
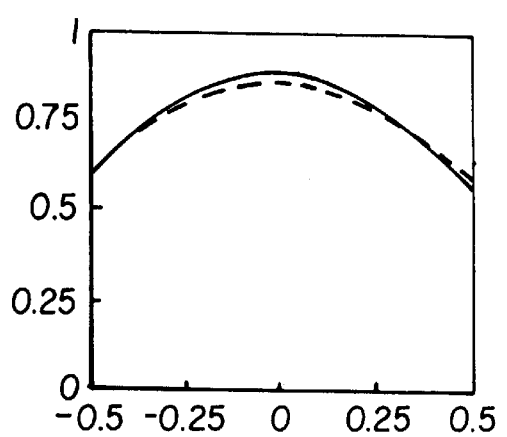
Figure 5O:
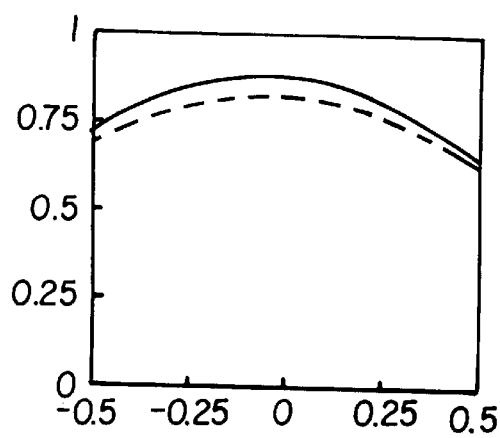
Figure 5P:
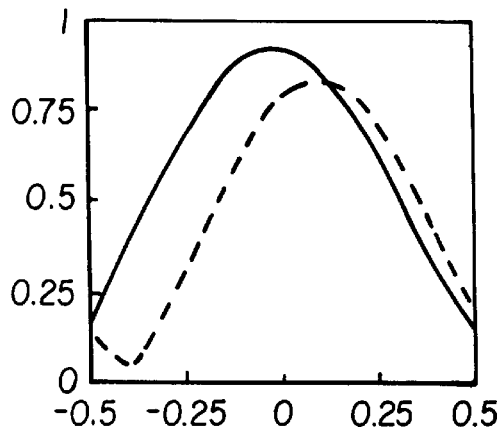
Figure 5Q:
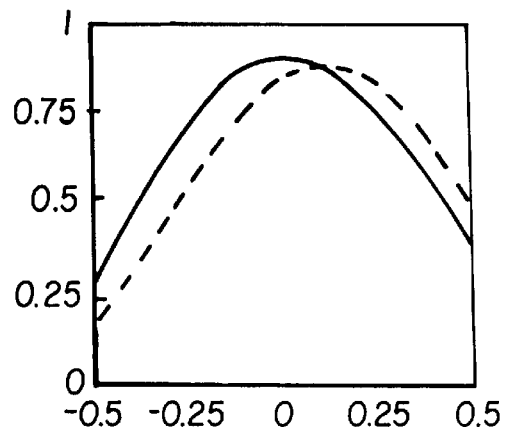
Figure 5R:
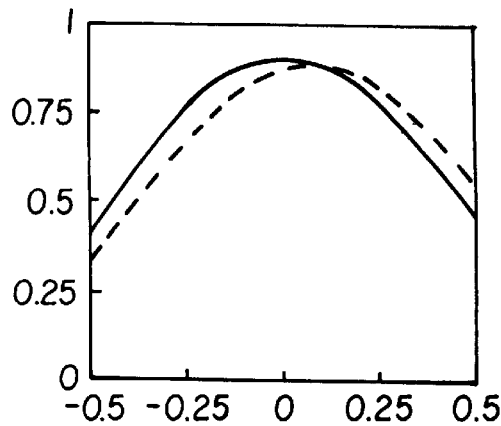
Figure 5S:
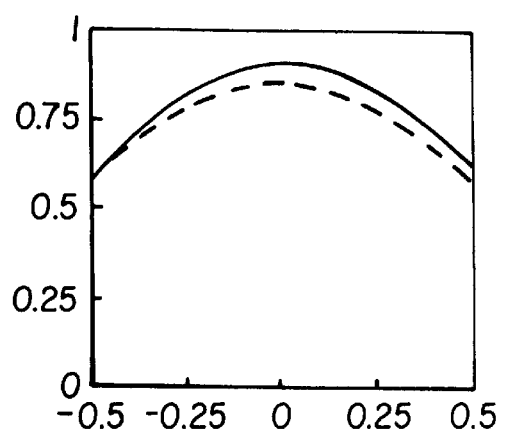
Figure 5T:
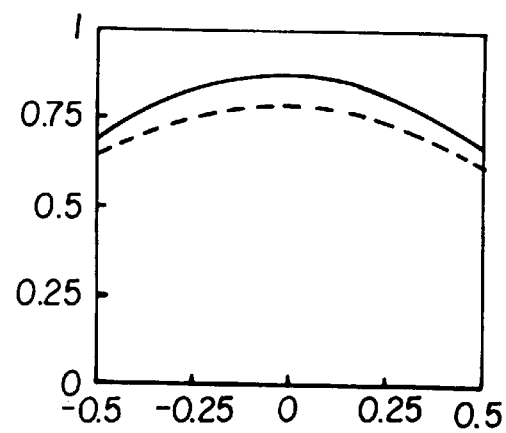
Figure 5U:
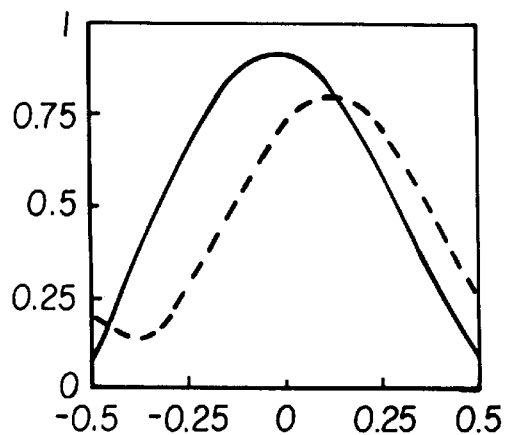
Figure 5V:
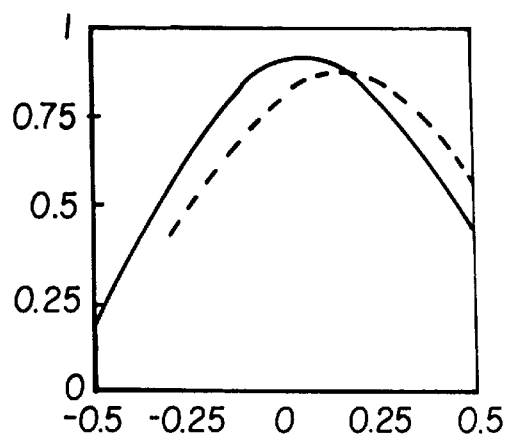
Figure 5W:
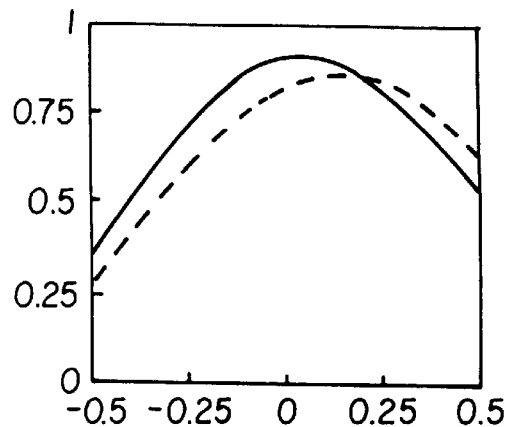
Figure 5X:
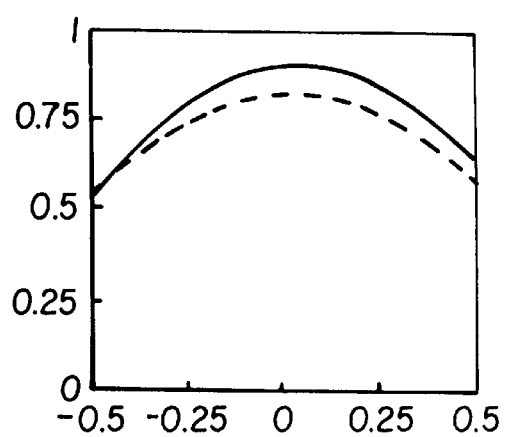
Figure 5Y:
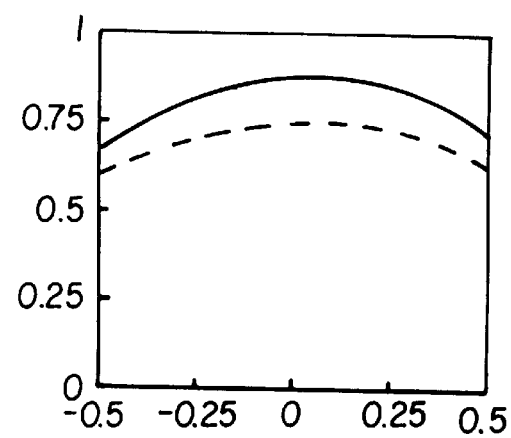
Figure 6A:
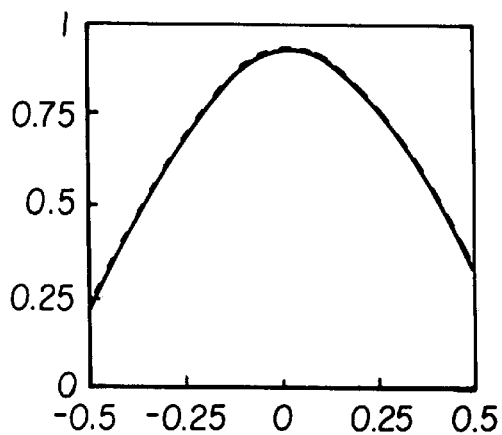
FIGS. 6A–6Y are plots of the through focus Modulation Transfer Function (MTF) of the zoom lens illustrated in FIGS. 3A–3E.
Figure 6B:
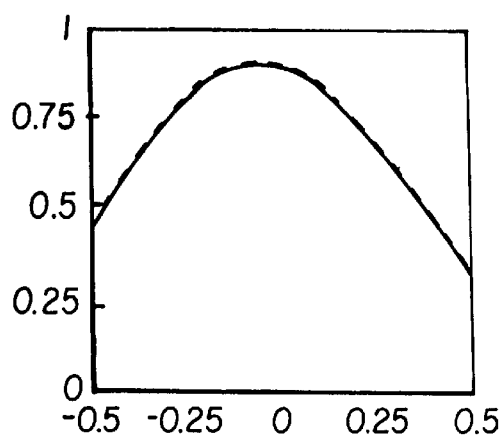
Figure 6C:
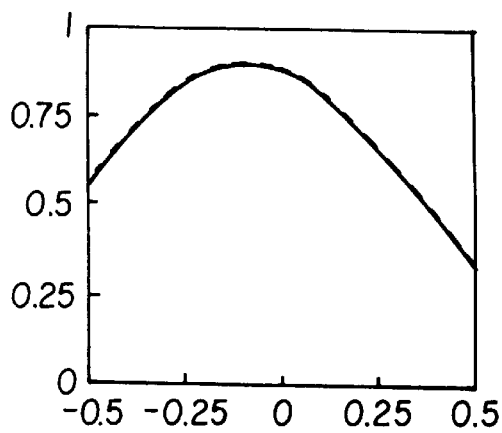
Figure 6D:
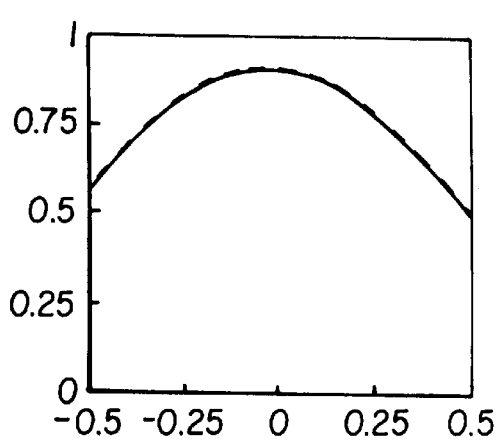
Figure 6E:
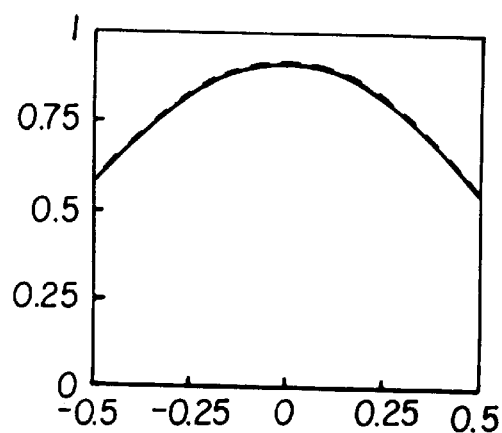
Figure 6F:
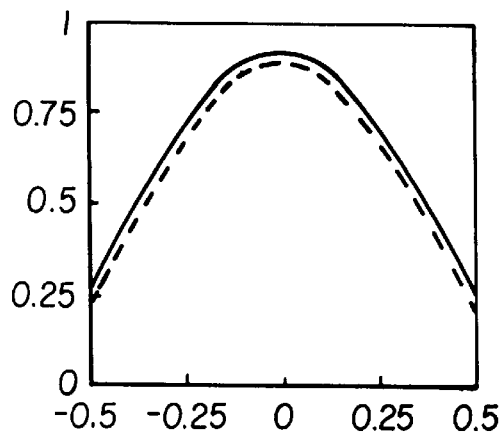
Figure 6G:
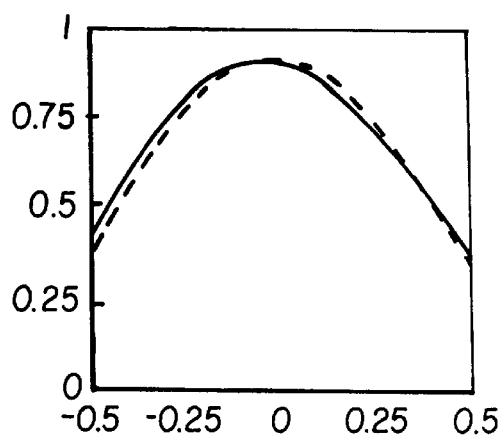
Figure 6H:
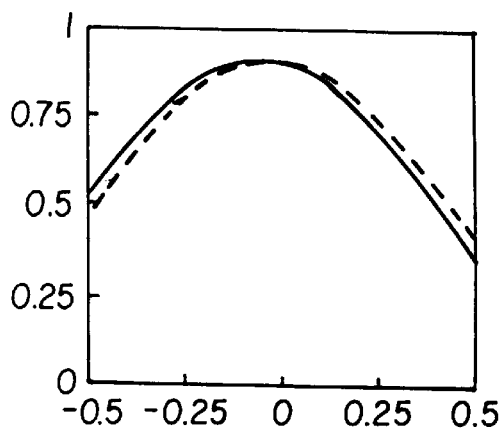
Figure 6I:
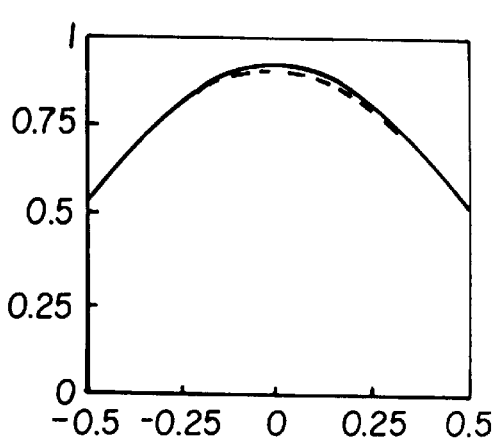
Figure 6J:
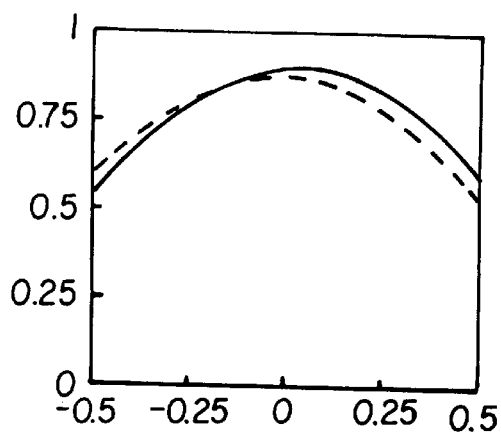
Figure 6K:
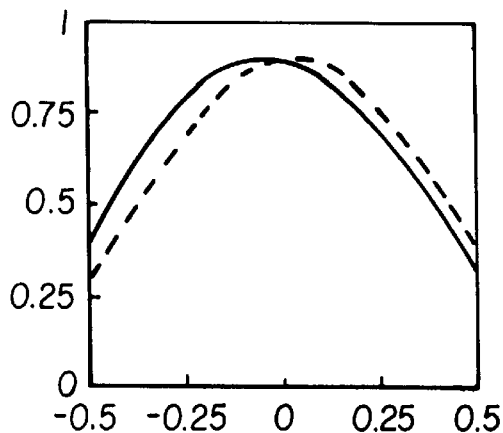
Figure 6L:
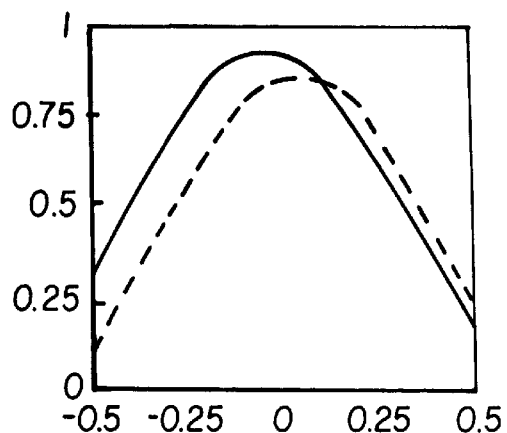
Figure 6M:
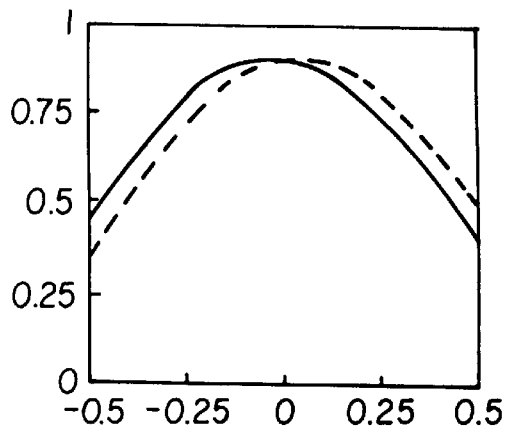
Figure 6N:
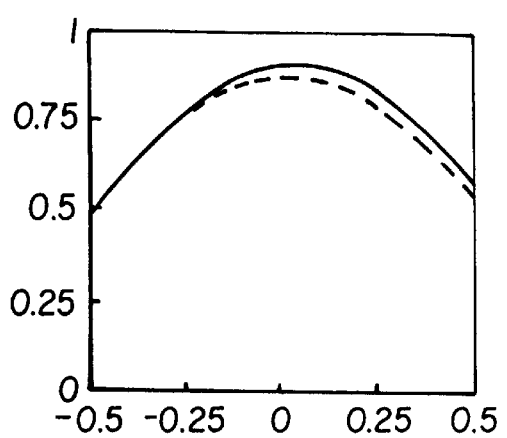
Figure 6O:
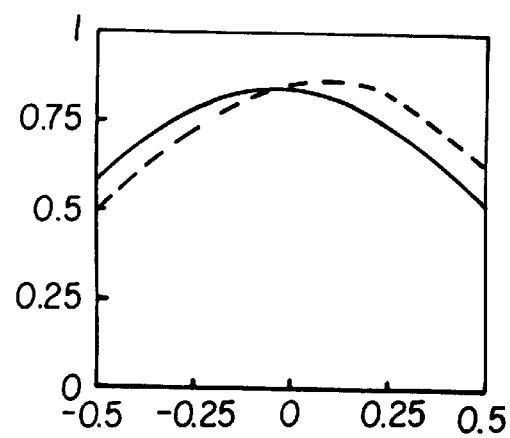
Figure 6P:
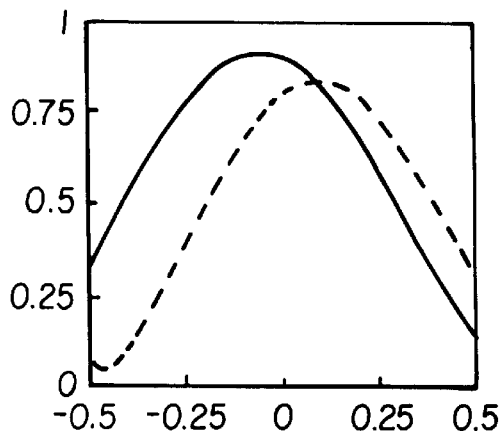
Figure 6Q:
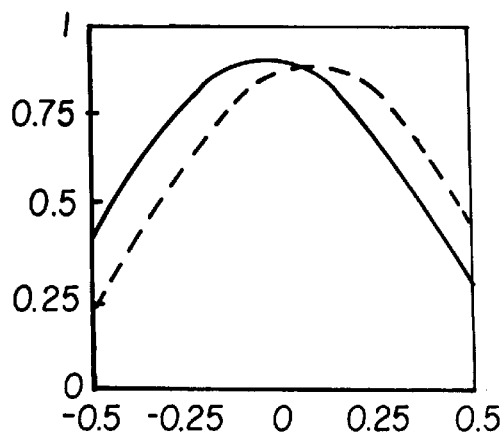
Figure 6R:
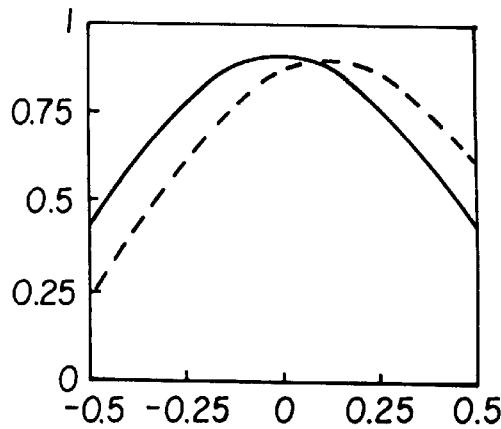
Figure 6S:
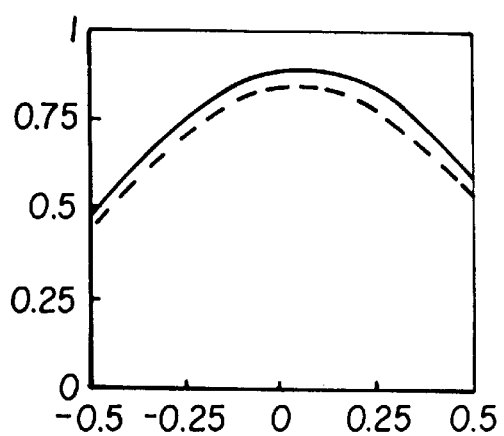
Figure 6T:
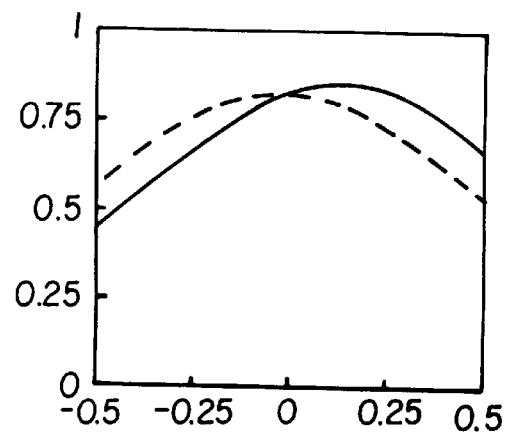
Figure 6U:
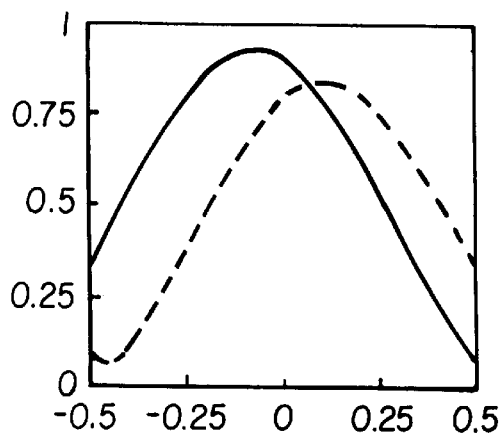
Figure 6V:
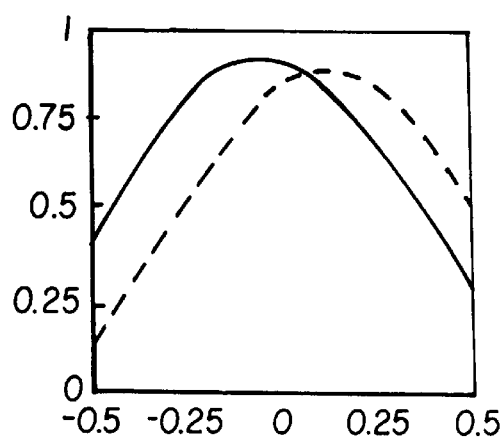
Figure 6W:
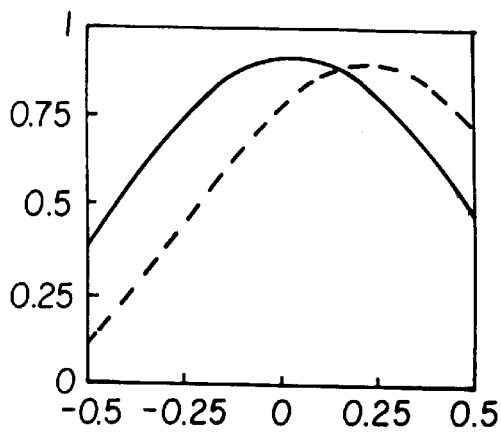
Figure 6X:
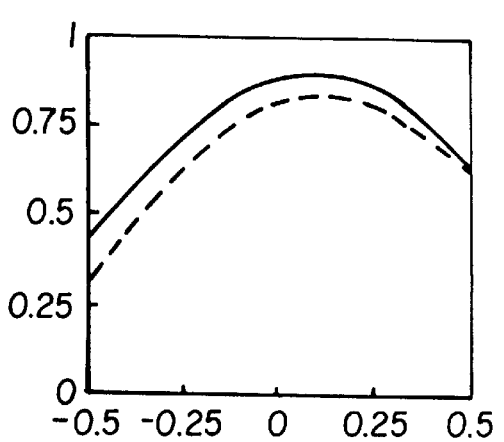
Figure 6Y:
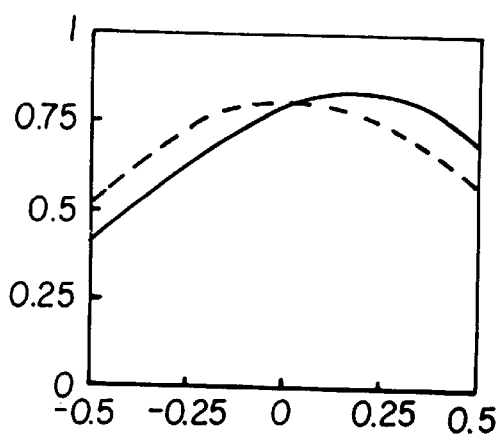

Other unique features of the zoom lens 100, 100' are the use of only seven elements to achieve a well corrected zoom system that exhibits excellent response over the whole zoom range with very little astigmatism or field curvature so that the depth of focus is maximized. As depicted in the modulation transfer function (MTF) graphs (FIGS. 5A–5Y and 6A–6Y), the depth of focus for 11 cycles/mm is substantial over an entire zoom range. FIGS. 5A–5Y correspond to the zoom lens 100. More specifically, FIGS. 5A–5E are through focus MTF plots at zero field (on axis), at each of the five zoom positions corresponding to the focal lengths of 26.8 mm, 39.5 mm, 58.1 mm, 85.6 mm and 126.1 mm, respectively. FIGS. 5F–5J are through focus MTF plots at 0.4 field at each of the five zoom positions. FIGS. 5K–5O are through focus MTF plots at 0.6 field at each of the five zoom positions. FIGS. 5P–5T are through focus MTF plots at 0.75 field at each of the five zoom positions. FIGS. 5U–5Y are through focus MTF plots at 0.9 field at each of the five zoom positions. Finally, FIGS. 6A–6Y correspond to the second zoom lens embodiments 100' and are similar to FIGS. 5A–5Y.

Aperture Stop

The aperture stop AS is located outside the middle moving unit U2 (see FIG. 2A). This feature is common in the zoom lenses with zoom ratios of less than about 3×, but is unique in a zoom lens that has a zoom ratio of greater than 4×. In a typical zoom lens with a large zoom ratio (such as 4× or larger) an aperture stop is located inside the middle lens unit. We found that when the aperture stop is placed inside the middle lens unit U2, a zoom lens becomes less compact. We also found that when the zoom lens has a zoom ratio of greater than 4× and satisfies the second inequality (i.e. the compactness requirement), the second lens unit U2 also becomes compact and leaves very little space for an iris diaphragm and its associated motor.

More specifically, the aperture stop AS of the zoom lens 100, 100' occupies space between the middle lens unit U2 and the rear lens unit U3 and in the telephoto position satisfies the following condition:

$$0 < S_\Pi/S_T < 1, \quad (9)$$

where $S_\Pi$ is the distance from the middle lens unit to the aperture stop and $S_T$ is the distance from the middle lens unit U2 to the rear lens unit U3 in the telephoto position (i.e., the distance from the rear lens surface of the front lens unit to the front most lens surface of the second lens unit). If the upper limit of the ninth inequality is exceeded, then the clear apertures of the front lens unit U1 become unnecessarily large and aberration control for distortion and astigmatism are difficult. If the lower limit is exceeded, then an iris diaphragm usage is not feasible because of space limitations. A fixed aperture diaphragm could be placed inside the middle lens unit, but this is not preferred because a fixed aperture diaphragm does not allow for the F-number control.

The following tables provide the numerical data for the first and second zoom lens embodiments 100, 100' of the present invention. It is understood that all of the parameters provided in the tables 1 and 2 can be scaled to provide zoom lenses with different focal length values.

TABLE 1 first zoom lens embodiment

| SURF# | CLEAR APER | RADIUS | THICKNESS | INDEX | V# |
|---|---|---|---|---|---|
| 1 | 22.46 | −33.196 | 1.500 | 1.786 | 44.2 |
| 2 | 21.29 | 43.895 | 0.250 | | |
| 3 | 21.29 | 53.229 | 2.9000 | 1.847 | 23.8 |
| 4 | 20.99 | −133.245 | A | | |
| 5 | 12.80 | ASPHERE | 3.600 | 1.620 | 60.3 |
| 6 | 12.33 | ASPHERE | 0.200 | | |
| 7 | 12.02 | 65.317 | 1.100 | 1.804 | 39.6 |
| 8 | 10.98 | 7.504 | 8.600 | 1.517 | 64.2 |
| 9 | 11.27 | ASPHERE | 1.000 | | |
| | 10.37 | DIAPHRAGM | B | | |
| 10 | 12.06 | ASPHERE | 5.000 | 1.847 | 23.8 |
| 11 | 13.88 | ASPHERE | 3.800 | | |
| 12 | 14.17 | −8.795 | 1.6000 | 1.773 | 49.6 |
| 13 | 19.14 | −62.645 | | | |

| EF | BF | LENS LENGTH | STOP DIAM.* | F/#. |
|---|---|---|---|---|
| 26.78 | 6.36 | 54.561 | 5.23 | 5.60 |
| 39.45 | 18.96 | 50.450 | 6.82 | 6.40 |
| 58.11 | 32.28 | 43.854 | 8.38 | 7.30 |
| 85.60 | 49.21 | 37.897 | 9.33 | 9.10 |
| 126.11 | 72.73 | 33.298 | 10.37 | 11.50 |

| EF | FRONT VERTEX TO IMAGE PLANE | A | B |
|---|---|---|---|
| 26.78 | 60.841 | 15.464 | 9.548 |
| 39.45 | 69.210 | 15.969 | 4.931 |
| 58.11 | 75.734 | 11.063 | 3.241 |
| 85.60 | 86.647 | 5.907 | 2.440 |
| 126.11 | 105.968 | 1.748 | 2.000 |

*iris diaphragm
ASPHERIC EQUATION:

$$X = \frac{CY^2}{1 + \sqrt{1 - (k+1)C^2 Y^2}} + DY^4 + EY^6 + FY^8 + GY^{10} + HY^{12}$$

| SURF. 5 | C = 0.0667557 | D = −0.91281E−04 | G = −0.76193E−09 |
| | k = 1.2719910 | E = −0.11546E−05 | H = 0.85198E−11 |
| | | F = 0.24021E−07 | |
| SURF. 6 | C = −0.0146705 | D = 0.25597E−04 | G = −0.58830E−09 |
| | k = 0.0 | E = −0.31872E−06 | H = 0.915411E−11 |

TABLE 1-continued first zoom lens embodiment

| | | F = 0.20461E−07 | |
| SURF. 9 | C = −0.0593014 | D = −0.19246E−03 | G = −0.42068E−09 |
| | k = −3.7823030 | E = −0.10088E−05 | H = −0.24662E−11 |
| | | F = 0.89014E−08 | |
| SURF. 10 | C = −0.0212062 | D = −0.38475E−04 | G = 0.0 |
| | k = −83.9356000 | E = 0.13279E−05 | H = 0.0 |
| | | F = 0.0 | |
| SURF. 11 | C = −0.0429240 | D = 0.65367E−04 | G = −0.32605E−09 |
| | k = 6.6849930 | E = −0.31910E−06 | H = 0.32359E−11 |
| | | F = 0.28338E−07 | |

TABLE II second lens embodiment

| SURF. | CLEAR APER. | RADIUS(1) | THICKNESS | INDEX | V# |
|---|---|---|---|---|---|
| 1 | 19.40 | −34.953 | 1.500 | 1.487 | 70.4 |
| 2 | 18.15 | 45.489 | 1.900 | 1.847 | 23.8 |
| 3 | 17.65 | 83.843 | A | | |
| 4 | 12.60 | ASPHERE | 4.150 | | |
| 5 | 11.96 | ASPHERE | 0.220 | | |
| 6 | 11.93 | −20.774 | 1.100 | 1.806 | 33.3 |
| 7 | 11.58 | 20.774 | 4.100 | 1.517 | 52.2 |
| 8 | 11.49 | −14.483 | 1.000 | | |
| | 10.46 | DIAPHRAGM | B | | |
| 9 | 12.84 | ASPHERE | 5.000 | | |
| 10 | 14.68 | ASPHERE | 2.850 | | |
| 11 | 14.77 | −9.4895 | 1.600 | 1.804 | 46.5 |
| 12 | 19.18 | −59.195 | | | |

| EF | BF | LENS LENGTH | STOP DIAM.* | F/# |
|---|---|---|---|---|
| 29.50 | 7.56 | 47.100 | 5.13 | 6.00 |
| 39.67 | 18.35 | 43.046 | 6.26 | 6.65 |
| 53.35 | 30.59 | 38.348 | 7.50 | 7.30 |
| 71.75 | 44.15 | 33.113 | 8.72 | 8.10 |
| 96.50 | 58.76 | 27.620 | 10.46 | 8.60 |

| EF | FRONT VERTEX TO IMAGE PLANE | A | B |
|---|---|---|---|
| 29.50 | 54.503 | 12.889 | 10.791 |
| 39.67 | 61.189 | 13.108 | 6.518 |
| 53.35 | 68.705 | 10.886 | 4.042 |
| 71.75 | 77.132 | 6.991 | 2.702 |
| 96.50 | 86.599 | 2.000 | 2.200 |

*iris diaphragm
ASPHERIC EQUATION $$X = \frac{CY^2}{1 + \sqrt{1 - C^2 Y^2}} + DY^4 + EY^6 + FY^8 + GY^{10}$$

| SURF. 4 | C = 0.07424 | D = −0.28664E−05 |
| | | E = −0.60571E−06 |
| | | F = 0.4895E−08 |
| | | G = 0.16048E−09 |
| SURF. 5 | C = −0.04457 | D = 0.10542E−03 |
| | | E = −0.12953E−05 |
| | | F = 0.29183E−07 |
| | | G = −0.43774E−10 |
| SURF. 9 | C = −0.02449 | D = 0.49349E−04 |
| | | E = −0.26552E−08 |
| | | F = 0.12815E−08 |
| | | G = 0.99778E−10 |
| SURF. 10 | C = −0.05119 | D = −0.32383E−05 |
| | | E = −0.16237E−06 |
| | | F = −0.58791E−09 |
| | | G = −0.25714E−10 |

Zoom Lens Performance

The quality of an optical system can be described by the MTF response exhibited by that system. This has been described in U.S. Pat. Nos. 5,466,560 and 4,758,852 and journal articles regarding the Subjective Quality Factor such as (Photographic Science & Engineering; Volume 16; Number 3; May-June 1972, for example). A zoom lens (such as the zoom lens 100, described herein) would be considered to be of very good to excellent in quality if, in the vicinity of the optical axis (OA) with evaluation wavelengths of 546.1 nm: 486.1 nm: 656.3 nm and weightings of 0.5:0.15:0.35 respectively, the MTF (Modulation Transfer Function) response is greater than 0.84 at the center of the SQF frequency band. (The center of the SQF band on a negative is 11 cycles/mm to provide 1 cycle/mm on the final photograph). In addition, at a spatial frequency of 22 cycles/mm in the vicinity of the optical axis, good lens quality would be found if the MTF response is greater than 0.74.

The zoom lens 100 has excellent quality in the vicinity of the optical axis (O.A.) throughout the zoom range as shown below in Table 3A.

TABLE 3A

| Effective Focal Length (mm) | MTF response @ 11 cycles/mm | MTF response @ 22 cycles/mm |
|---|---|---|
| 26.8 | 0.95 | 0.89 |
| 39.5 | 0.89 | 0.74 |
| 58.1 | 0.88 | 0.73 |
| 85.6 | 0.89 | 0.77 |
| 126.1 | 0.89 | 0.77 |

At the 75% obliquity under the same conditions, where the sigittal (S) field response precedes the tangential (T) response (i.e., S/T), the zoom lens 100 has the following MTF characteristics.e

TABLE 3B

| | (75% obliquity) | |
|---|---|---|
| Effective Focal Length (mm) | MTF response @ 11 cycles/mm S/T | MTF response @ 22 cycles/mm S/T |
| 26.8 | 0.93/0.81 | 0.85/0.82 |
| 39.5 | 0.93/0.87 | 0.84/0.70 |
| 58.1 | 0.91/0.88 | 0.80/0.69 |
| 85.6 | 0.91/0.86 | 0.80/0.63 |
| 126.1 | 0.89/0.81 | 0.77/0.51 |

As can be seen, the quality of the zoom lens 100 (even in the 0.75 field) is very good to excellent at 11 cycles/mm and is acceptable at 22 cycles/mm.

TABLE 4A

| EFFECTIVE FOCAL LENGTH/mm | MTF RESPONSE @ 11 CYCLES/mm | MTF RESPONSE @ 22 CYCLES/MM |
|---|---|---|
| 29.5 | 0.94 | 0.86 |
| 39.67 | 0.91 | 0.80 |
| 53.35 | 0.89 | 0.75 |
| 71.75 | 0.92 | 0.84 |
| 96.5 | 0.92 | 0.82 |

TABLE 4B

| | (75% obliquity) | |
|---|---|---|
| EFFECTIVE FOCAL LENGTH/mm | MTF RESPONSE @ 11 CYCLES/mm S/T | MTF RESPONSE @ 22 CYCLES/mm S/T |
| 29.5 | 0.93/0.83 | 0.83/0.56 |
| 39.67 | 0.93/0.90 | 0.85/0.78 |
| 53.35 | 0.92/0.88 | 0.84/0.70 |
| 71.75 | 0.91/0.87 | 0.81/0.69 |
| 96.5 | 0.84/0.84 | 0.67/0.65 |

Table 4A and 4B are similar to Tables 3A and 3B. They indicate the MTF response for the zoom lens 100'.

The invention has been described in detail with particular reference to certain preferred embodiments thereof, but it will be understood that variations and modifications can be effected within the spirit and scope of the invention.

PARTS LIST

100, 100' zoom lens
U1 front lens units
U2 middle lens unit
U3 rear lens unit
E1, E2, E3, E4, E5, E6 lens elements
200 object
300 image plane
400 optical axis

What is claimed is:

1. A zoom lens having a focal length that changes from one zoom position to another zoom position, said zoom lens creating an image at an image plane and comprising:

a plurality of lens elements arranged in three zooming lens units spaced from one another by axial distances that vary during zooming, wherein at least one of said three lens units continually moves away from said image plane as said zoom lens zooms from a wide angle position toward a telephoto position, so that the distance from said one lens unit to said image plane varies in a sigmoidal relation with respect to said focal length of said zoom lens, said three lens units being (i) a negative power front lens unit;
   (ii) a positive power middle lens unit, accepting light from said negative power front lens unit; and
   (iii) a negative power rear lens unit, accepting light from said positive power middle lens unit.

2. A zoom lens according to claim 1 wherein said zoom lens satisfies the following inequalities $$\frac{Ft}{Fw} > 3.5;$$

$$FVFPt \leq Ft; \text{ and}$$

$$FVFPo < FVFPt,$$

where

Ft is the focal length of said zoom lens in the telephoto position,

Fw is the focal length of said zoom lens in the wide angle position,

FVFPt is a front vertex to image plane distance when said zoom lens is in the telephoto position, and FVFPo is a front vertex to image plane distance when the zoom lens is in any zoom position other than the telephoto position.

3. A zoom lens according to claim 1 wherein 0.6<FVFPt/Ft<0.9.

4. A zoom lens having a focal length that changes from one zoom position to another zoom position, said zoom lens creating an image on an image plane and comprising a plurality of lens elements arranged in three zooming lens units spaced from one another by axial distances that vary during zooming, said zoom lens being characterized by
  (i) a negative power front lens unit;
  (ii) a positive power middle lens unit, accepting light from said negative power front lens unit;
  (iii) a negative power rear lens unit, accepting light from said positive power middle lens unit; and
  (iv) one of said lens units continually moving away from said image plane as said zoom lens zooms from a wide angle position toward a telephoto position (1) at a first rate as said zoom lens moves from said wide angle position to a first intermediate position, (2) at a second, slower rate as said zoom lens moves from said first intermediate position to a second intermediate position, and (3) at a third rate which is faster than said second rate, when said zoom lens moves from said second intermediate position toward said telephoto position.

5. A zoom lens having a focal length that changes from one zoom position to another zoom position, said zoom lens creating an image on an image plane and comprising a plurality of lens elements arranged in three zooming lens units spaced from one another by axial distances that vary during zooming, said zoom lens being characterized by
  (i) a negative power front lens unit spaced from the image plane by a predetermined distance, said predetermined distance continually increasing as said zoom lens zooms from a wide angle position toward a telephoto position, and said front lens unit moves away from said image plane (1) at a first rate as said zoom lens moves from said wide angle position to a first intermediate position, (2) at a second, slower rate as said zoom lens moves from said first intermediate position to a second intermediate position, and (3) at a third rate which is faster than said second rate, when said zoom lens moves from said second intermediate position towards said telephoto position;
  (ii) a positive power middle lens unit, accepting light from said negative power front lens unit; and
  (iii) a negative power rear lens unit, accepting light from said positive power middle lens unit; and wherein said zoom lens satisfies the following inequalities;

$$\frac{Ft}{Fw} > 3.5;$$

$$FVFPt \leq Ft; \text{ and}$$

$$FVFPo < FVFPt,$$

where
Ft is the focal length of said zoom lens in said telephoto position,
Fw is the focal length of said zoom lens in said wide angle position,
FVFPt is a front vertex to image plane distance when said zoom lens is in said telephoto position, and
FVFPo is a front vertex to image plane distance when the zoom lens is in any zoom position other than said telephoto position.

6. A zoom lens according to claim 5 wherein each of said zoom lens units is continuously movable away from the image plane as said zoom lens zooms from the wide angle position to the telephoto position.

7. A zoom lens providing an image at an image plane and having a focal length that changes from one zoom position to another zoom position, said zoom lens comprising a plurality of lens elements arranged in three zooming lens units spaced from one another by axial distances that vary during zooming, said zoom lens being characterized by
  a negative power front lens unit;
  a positive power middle lens unit, accepting light from said negative power front lens unit; and
  a negative power rear lens unit, accepting light from said positive power middle lens unit; and
  wherein (1) each one of said lens units is continually movable away from the image plane as said zoom lens zooms from a wide angle position to a telephoto position, (2) one of said lens units is being positioned a predetermined distance away from another one of said lens units, said predetermined distance continuously (A) increases as said zoom lens zooms from said wide angle position to an intermediate position, and (B) continuously decreases as said zoom lens zooms from said intermediate position to said telephoto position; and (3) said zoom lens satisfies the following inequalities;

$$\frac{Ft}{Fw} > 3.5;$$

$$FVFPt \leq Ft; \text{ and}$$

$$FVFPo < FVFPt,$$

where
Ft is the focal length of said zoom lens in said telephoto position,
Fw is the focal length of said zoom lens in said wide angle position,
FVFPt is a front vertex to image plane distance when said zoom lens is in said telephoto position, and
FVFPo is a front vertex to image plane distance when the zoom lens is in any zoom position other than said telephoto position.

8. A zoom lens according to claim 7 wherein 0.6<Ft/FVFPt<0.9.

9. A zoom lens according to claim 8 wherein 1.7<$B_{3T}/B_{3W}$<4.0, where
  $B_{3T}$ is the magnification of said negative power rear lens unit in said telephoto position and $B_{3W}$ is the magnification of said negative power rear lens unit in said wide angle position.

10. A zoom lens according to claim 8 wherein
0.10<$|f_2/Ft|$<0.20
0.5<$|f_3/Fw|$<1.0,
  where $f_2$ is a focal length of said positive power middle lens unit and $f_3$ is a focal length of said negative power rear lens unit.

11. A zoom lens according to claim 7 wherein said one of said lens units is said negative power front lens unit and said another one of said lens units is said positive power middle lens unit.

12. A zoom lens according to claim 11 wherein 0.6<FVFPt/Ft<0.9.

13. A zoom lens according to claim 12 wherein said negative power rear lens unit has a magnification $B_{3T}$ in said telephoto position and a magnification $B_{3W}$ in said wide angle position such that $1.7 < B_{3T}/B_{3W} < 4.0$.

14. A zoom lens according to claim 11 wherein
said positive power middle lens unit has a focal length $f_2$ and said negative power rear lens unit has a focal length $f_3$ such that
$0.10 < |f_2/Ft| < 0.20$
$0.5 < |f_3/Fw| < 1.0$.

15. A zoom lens according to claim 12 wherein
$0.10 < |f_2/Ft| < 0.20$
$0.5 < |f_3/Fw| < 1.0$,
where $f_2$ is a focal length of said positive power middle lens unit and $f_3$ is a focal length of said negative power rear lens unit.

16. A zoom lens according to claim 11 wherein
$1.2 < (e_{1W} - e_{1T})/(e_{2W} - e_{2T}) < 3.0$ and
$e_{1W} < e_{1M}$,
where $e_{1W}$, $e_{1T}$ is the distance between said negative power front lens unit and said positive power middle lens unit, when said zoom lens is in the wide angle position and the telephoto position, respectively; $e_{2W}$, $e_{2T}$ is the distance between said positive power middle lens unit and said negative power rear lens unit in the wide angle position and the telephoto position, respectively; and $e_{1M}$ is the distance between said negative power front lens unit and said positive power middle lens at some intermediate zoom position.

17. A zoom lens according to claim 12 wherein
$1.2 < (e_{1W} - e_{1T})/(e_{2W} - e_{2T}) < 3.0$ and
$e_{1W} < e_{1M}$,
where $e_{1W}$, $e_{1T}$ is the distance between said negative power front lens unit and said positive power middle lens unit, when said zoom lens is in the wide angle position and the telephoto position, respectively; $e_{2W}$, $e_{2T}$ is the distance between said positive power middle lens unit and said negative power rear lens unit in the wide angle position and the telephoto position, respectively; and $e_{1M}$ is the distance between said negative power front lens unit and said positive power middle lens unit at some intermediate zoom position.

18. A zoom lens according to claim 7 wherein
(i) said negative power front lens unit comprises at least one negative power lens element and at least one positive power lens element;
(ii) said positive power middle lens unit comprises at least one positive power lens element and at least one negative power lens; and
(iii) said negative power rear lens unit comprises at least one positive power lens element and at least one negative power lens element.

19. A zoom lens according to claim 18 wherein
said positive power middle lens unit comprises two positive power lens elements and a negative power lens element sandwiched therebetween.

* * * * *